Sept. 7, 1943.　　C. E. PETERSON ET AL　　2,329,135
WORK SUPPORT
Filed Dec. 5, 1941　　2 Sheets-Sheet 1

Inventors:
Conrad E. Peterson
and
Gordon L. Olson,
by J. H. McCrady
Attorney.

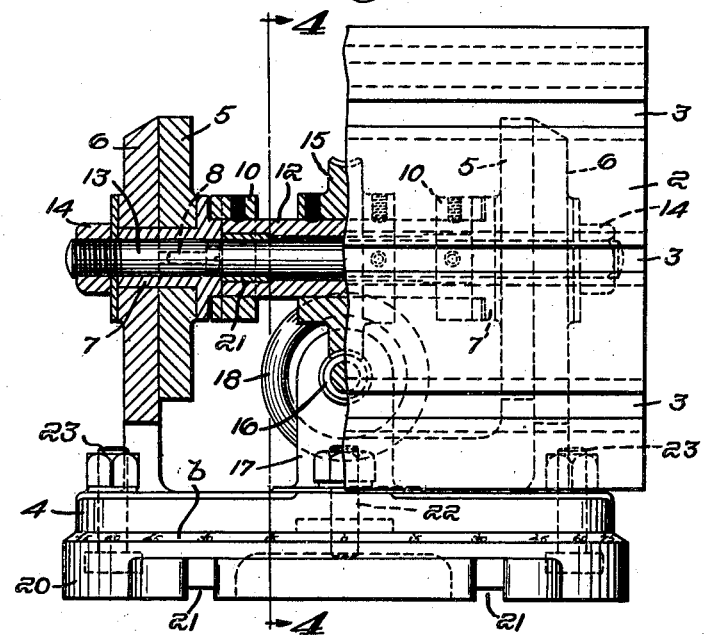
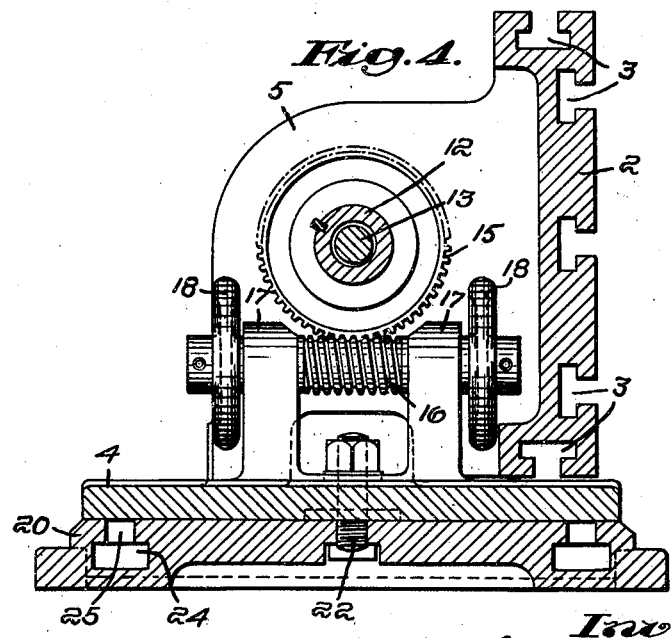

Patented Sept. 7, 1943

2,329,135

UNITED STATES PATENT OFFICE 2,329,135

WORK SUPPORT

Conrad E. Peterson, Auburndale, and Gordon L. Olson, Arlington, Mass.

Application December 5, 1941, Serial No. 421,766

6 Claims. (Cl. 90—58)

This invention relates to apparatus for supporting various articles of work while manufacturing operations are performed on them such, for example, as milling, planing, grinding, drilling, and the like. The invention aims to devise a work support of this general character having capacity for approximately universal adjustment so that it can support a work piece rigidly in any one of a great variety of positions suited to the requirements of the particular operation to be performed on it.

The nature of the invention will be readily understood from the following description when read in connection with the accompanying drawings and the novel features will be particularly pointed out in the appended claims.

In the drawings,

Fig. 3 is an elevation of the right-hand side of the work support as illustrated in Fig. 2, some of the parts being shown in section;

Fig. 4 is a vertical, sectional view approximately on the line 4—4, Fig. 3; and

Figure 1:
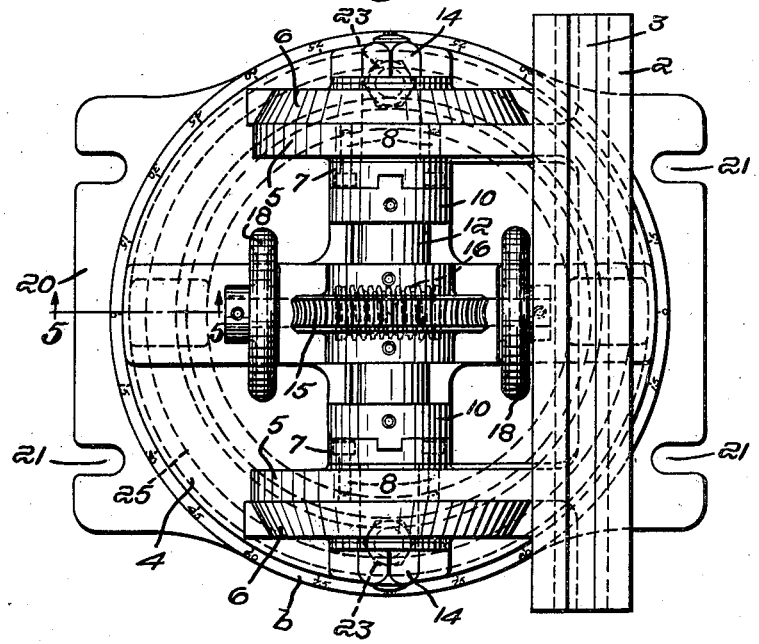
Figure 1 is a plan view of a work support constructed in accordance with this invention.
Figure 5:
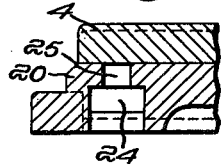
Fig. 5 is a fragmentary, sectional view through the edges of the base and the bed plate illustrating details of construction.

The construction shown comprises a face plate 2 provided with a series of T-shaped grooves 3, or otherwise constructed for the convenient attachment thereto of a work piece. This face plate is mounted for adjustment in a vertical plane (assuming that the device normally is supported in a horizontal position) relatively to a base 4. For this purpose the face plate has two plate-like arms 5—5 integral therewith and projecting rearwardly therefrom, and the base 4 is provided with two upstanding plate-like trunnions 6—6 between and in contact with which the arms 5—5 are mounted. The mounting mechanism includes two bushings 7—7 best shown in Fig. 3, both provided with flanges which are secured by screws 8 to their respective arms 5—5, and each fitting snugly in a hole reamed to fit it in one of the trunnions 6. Keyed to these bushings are two collars 10—10 mounted on the opposite ends of a sleeve 12, and a shaft or bolt 13 extends through this sleeve and both bushings and is threaded at its opposite ends to receive clamping nuts 14—14.

Adjustment of the angle plate around the common axis of the bushing 7—7 preferably is produced by means of a worm wheel 15 meshing with a worm 16, the end portions of the worm being journaled in trunnions 17 which may be cast integral with the base 4. Hand wheels 18—18 are secured to the opposite ends of the worm shaft. The worm wheel is secured fast on the sleeve 12 and the latter member preferably is spaced from the shaft 13 by bushings at opposite ends of the sleeve, one of these bushings being shown at 21 in Fig. 3.

Figure 2:
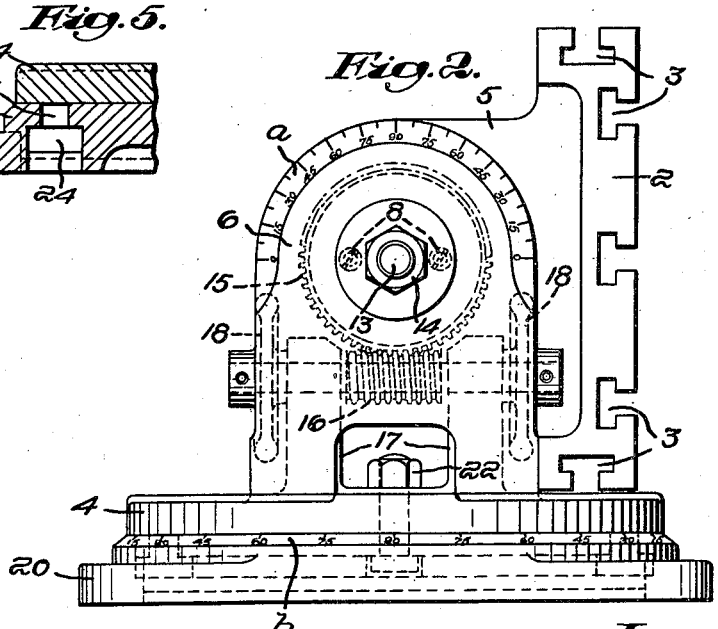
Fig. 2 is a side elevation of the device shown in Fig. 1.

It will thus be evident that by rotating either of the hand wheels 18, the face plate 2 may be adjusted around the axis of the pivot bushings 7—7, and since the worm and worm wheel adjusting mechanism is irreversible, it will hold the face plate in any position to which it is adjusted. However, it is usually preferred to lock the arms 5—5 of the face plate to the trunnions 6—6 by tightening up the clamping nuts 14—14 when the face plate has been adjusted to the desired position, and these nuts are backed off before making any further adjustment of the face plate. The bevelled surfaces a, Fig. 2, of the trunnions 6—6 are graduated in degrees to cooperate with one or more index marks on the adjacent surfaces of the arms 5—5 to indicate the angle of inclination of the face plate relatively to a horizontal plane. As will be readily seen from an inspection of Fig. 2, the parts are so dimensioned and arranged that the face plate can be adjusted through an angle of 180°. That is, the adjusting mechanism for the face plate, including the worm gear 15 and the means for supporting and operating it, are all located inside the arc of swing of the face plate 2.

In addition to the adjustment just described, provision also is made for adjusting the face plate in a horizontal plane through a complete revolution, if desired. For this purpose the base 4 is mounted on a bed plate 20 which, as best shown at 21 in Fig. 1, is slotted to receive bolts by means of which it can be secured to the machine with which it is to be used. A pivot bolt 22 connects the base plate with the bed plate, the axis of this bolt intersecting the axis of the pivot bushings 7—7 above referred to at the center of the worm wheel 15. Consequently, by loosening the nut on this bolt the base plate 4 can be adjusted around it, and since the base plate carries the face plate and its supporting and adjusting means, all of these parts move with it. A bevelled edge b, Figs. 1 and 2, on the marginal portion of the bed plate immediately below the edge of the base plate 4 is graduated in degrees to cooperate with index marks on the base to show the angular relationship of the face plate to the bed. Two bolts 23—23, best shown in Fig. 3, pass through holes in the base 4 and have heads running in a circumferential groove 24, Fig. 4, formed in the bed plate, so that by tightening up the nuts on these bolts the base may be secured in any desired position of adjustment. Webs are provided at convenient points to secure the central portion of the bed rigidly to its marginal portion.

Because the face plate is adjustable about a horizontal axis through an angle of 180° and the base on which it is mounted also is adjustable about a vertical axis through 360°, the face plate may be adjusted into a great variety of angular positions in which it will support work pieces of numerous forms for the particular operation to be performed on an individual work piece by a given machine. Consequently, a work support of this nature finds a multitude of uses in practically any machine shop.

While we have herein shown and described a preferred embodiment of our invention, it will be evident that the invention is not limited to embodiment in the precise form shown.

Having thus described our invention, what we desire to claim as new is:

1. A work support of the character described, comprising a face plate constructed for the attachment thereto of articles of work, a horizontal base provided with two parallel plate-like trunnions spaced apart and extending upwardly from said base, said face plate having two rearwardly extending plate-like arms rigid therewith, said arms overlapping said respective trunnions and having broad bearing engagement with them, a horizontal shaft extending through said arms and said trunnions, bushings secured to said respective arms and encircling the portions of the shaft where it passes through each arm and its cooperating trunnion, whereby said bushings cooperate with said shaft to support said face plate for angular adjustment around the axis of said shaft, a worm gear encircling said shaft between said bushings and secured to them, a worm shaft mounted on said base, a worm on the latter shaft meshing with said worm to drive it, and means operable to revolve said worm shaft.

2. A work support according to preceding claim 1, in which said worm gear and said worm shaft and the means for operating said shaft are mounted within the arc of swing of said face plate where they permit adjustment of the latter through an angle of approximately 180°.

3. A work support of the character described, comprising a face plate constructed for the attachment thereto of articles of work, a horizontal base provided with two parallel plate-like trunnions spaced apart and extending upwardly from said base, said face plate being grooved on its face and also on two edges at right angles to said face to receive fastenings by means of which articles of work may be secured to it, said face plate having two rearwardly extending plate-like arms rigid therewith, said arms overlapping said respective trunnions and having broad bearing engagement with them, means pivotally connecting said arms with said trunnions and supporting said face plate for angular adjustment around a horizontal axis relatively to said base and through an angle of approximately 180°, and a worm gearing mounted on said base between said trunnions for producing said face adjusting movement.

4. A work support according to preceding claim 1, including a nut screw threaded on one end of said horizontal shaft and a head on the other whereby, upon tightening said nut, said arms will be clamped to said trunnions.

5. A work support according to preceding claim 1, in combination with a bed on which said base is mounted, and means connecting said base and said bed together for pivotal adjustment of the base relatively to the bed around a vertical axis intersecting the horizontal axis of said shaft, and means for securing said base to said bed in various positions of angular adjustment relatively thereto.

6. A work support of the character described, comprising a face plate constructed for the attachment thereto of articles of work, a horizontal base provided with two parallel plate-like trunnions spaced apart and extending upwardly from said base, said face plate having two rearwardly extending plate-like arms rigid therewith, said arms overlapping said respective trunnions and having broad bearing engagement with them, means pivotally connecting said arms with said trunnions and supporting said face plate for angular adjustment around a horizontal axis relatively to said base through an angle of approximately 180°, a worm gear between said arms and rigidly connected with them, a worm mounted on said base between said trunnions and meshing with said worm gear to drive it, and means operable to revolve said worm and thereby to adjust said face plate around said axis, said worm and the worm gear being located within the arc of swing of said face plate.

CONRAD E. PETERSON.
GORDON L. OLSON.